United States Patent
Ben-Asher et al.

(10) Patent No.: US 10,421,881 B2
(45) Date of Patent: Sep. 24, 2019

(54) PAI-BASED COATING COMPOSITION

(71) Applicant: CYMER-DAYTON, LLC, Decatur, TN (US)

(72) Inventors: Limor Ben-Asher, Cresskill, NJ (US); David Edward Noga, Spring City, TN (US); Zhongliang Zhu, Fremont, CA (US); Anderson Bouton, Chattanooga, TN (US)

(73) Assignee: CYMER-DAYTON, LLC, Decatur, TN (US)

( * ) Notice: Subject to any disclaimer, the term of this patent is extended or adjusted under 35 U.S.C. 154(b) by 0 days.

(21) Appl. No.: 16/166,849

(22) Filed: Oct. 22, 2018

(65) Prior Publication Data

US 2019/0112501 A1  Apr. 18, 2019

Related U.S. Application Data

(62) Division of application No. 15/249,297, filed on Aug. 26, 2016, now Pat. No. 10,106,702.

(60) Provisional application No. 62/347,020, filed on Jun. 7, 2016, provisional application No. 62/346,443, filed on Jun. 6, 2016, provisional application No. 62/346,440, filed on Jun. 6, 2016.

(51) Int. Cl.

| | | |
|---|---|---|
| *C08G 73/14* | (2006.01) | |
| *C09D 179/08* | (2006.01) | |
| *B01J 2/02* | (2006.01) | |
| *C08J 3/14* | (2006.01) | |
| *C08G 73/10* | (2006.01) | |
| *C09D 7/20* | (2018.01) | |
| *C09D 5/16* | (2006.01) | |
| *C08J 7/04* | (2006.01) | |
| *C08K 5/00* | (2006.01) | |

(52) U.S. Cl.
CPC .............. *C09D 179/08* (2013.01); *B01J 2/02* (2013.01); *C08G 73/1003* (2013.01); *C08G 73/14* (2013.01); *C08J 3/14* (2013.01); *C08J 7/047* (2013.01); *C09D 5/1637* (2013.01); *C09D 7/20* (2018.01); *C08J 2379/08* (2013.01); *C08J 2479/08* (2013.01); *C08K 5/0008* (2013.01)

(58) Field of Classification Search
CPC ......... C08G 73/14; C09D 179/08; C09D 7/20
See application file for complete search history.

(56) References Cited

U.S. PATENT DOCUMENTS

| | | | |
|---|---|---|---|
| 3,267,074 A | 8/1966 | Wood | |
| 4,026,876 A * | 5/1977 | Bateman | C08G 69/26 428/435 |
| 4,205,162 A | 5/1980 | Herscovici | |
| 4,259,221 A | 5/1981 | Pauze | |
| 4,480,088 A | 10/1984 | Pike | |
| 5,135,974 A | 8/1992 | Moore | |
| 6,048,924 A | 4/2000 | Obayashi et al. | |
| 6,172,129 B1 | 1/2001 | Fan et al. | |
| 6,232,372 B1 | 5/2001 | Brothers et al. | |
| 6,420,466 B1 | 7/2002 | Haubennestel et al. | |
| 6,479,581 B1 | 11/2002 | Ireland et al. | |
| 7,998,370 B2 | 8/2011 | Hama et al. | |
| 8,669,305 B2 | 3/2014 | Fujimoto et al. | |
| 2005/0025978 A1 | 2/2005 | Okada et al. | |
| 2005/0215689 A1 | 9/2005 | Garbar et al. | |
| 2008/0312356 A1 | 12/2008 | Kobrin et al. | |
| 2013/0217812 A1* | 8/2013 | Sidenstick | C08G 73/14 524/96 |
| 2014/0343223 A1* | 11/2014 | Reinerth | C08K 5/0025 524/600 |
| 2015/0299513 A1 | 10/2015 | Kelly et al. | |

FOREIGN PATENT DOCUMENTS

| | | |
|---|---|---|
| JP | 02-117957 | 5/1990 |
| KR | 20150051900 | 5/2015 |
| WO | 2015144663 | 10/2015 |

OTHER PUBLICATIONS

PCT/US2017/35999 International Search Report dated Aug. 28, 2017.
PCT/US2017/35997 International Search Report dated Aug. 28, 2017.
PCT/US2017/35998 International Search Report dated Aug. 28, 2017.

* cited by examiner

*Primary Examiner* — Gregory Listvoyb
(74) *Attorney, Agent, or Firm* — Polsinelli PC (57) ABSTRACT

A process for PAI-based coating compositions. An embodiment of a method includes manufacturing a coating composition, the manufacturing of the coating composition including mixing a first solvent, the first being solvent being N-formyl morpholine (NFM), with a second solvent to form a first solution; dissolving polyamideimide or polyamide amic acid resin polymer (PAI) in the first solution; precipitating a PAI compound from to mixture of MEK and the first solution; and dissolving the PAI compound in a second solution to generate a coating solution.

20 Claims, 5 Drawing Sheets

Fig. 1

| Powder Coating Solutions to Demonstrate Viscosity Control | Type of PAI powder used | Sample Solvent Composition | Amount of powder (g) | NBP:Co-solvent ratio by mass | PAI % Solids | DVII @ 23C viscosity (cPs) | Viscosity % Reduction Relative to 100% NBP |
|---|---|---|---|---|---|---|---|
| Coating Composition Inventive Example 1 | From solvent-based resin Inventive Example II | 100% NBP | 0.8877 | 1.00 | 20.97% | 950 | 0% |
| Coating Composition Inventive Example 2 | From solvent-based resin Inventive Example II | 90/10 NBP/BA | 0.9310 | 0.90 | 21.02% | 770 | 19% |
| Coating Composition Inventive Example 3 | From solvent-based resin Inventive Example II | 80/20 NBP/BA | 0.8906 | 0.80 | 20.99% | 645 | 32% |
| Coating Composition Inventive Example 4 | From solvent-based resin Inventive Example II | 70/30 NBP/BA | 0.9317 | 0.70 | 20.96% | 577 | 39% |
| Coating Composition Inventive Example 5 | From solvent-based resin Inventive Example II | 90/10 NBP/CHN | 0.8924 | 0.90 | 21.01% | 900 | 5% |
| Coating Composition Inventive Example 6 | From solvent-based resin Inventive Example II | 80/20 NBP/CHN | 0.9036 | 0.80 | 20.98% | 832 | 12% |
| Coating Composition Inventive Example 7 | From solvent-based resin Inventive Example II | 70/30 NBP/CHN | 0.9680 | 0.70 | 20.98% | 788 | 17% |
| Coating Composition Inventive Example 8 | From solvent-based resin Inventive Example II | 90/10 NBP/MDP | 0.8519 | 0.90 | 20.97% | 893.1 | 6% |
| Coating Composition Inventive Example 9 | From solvent-based resin Inventive Example II | 80/20 NBP/MDP | 0.9412 | 0.80 | 20.97% | 831.1 | 13% |
| Coating Composition Inventive Example 10 | From solvent-based resin Inventive Example II | 85/15 NBP/Oct | 0.9550 | 0.85 | 21.00% | 742.0 | 22% |
| Coating Composition Inventive Example 11 | From solvent-based resin Inventive Example II | 70/30 NBP/Oct | 0.8986 | 0.70 | 20.99% | 606.4 | 36% |

*Fig. 2A*

| Powder Coating Solutions to Demonstrate Improved Solubility | Type of PAI powder used | Powder % | Base | Base % | Solvent | Solvent % | PGME% | Water % | MB % | Details |
|---|---|---|---|---|---|---|---|---|---|---|
| Coating Composition Inventive Example 12 | From solvent-based resin Inventive Example II | 4 | - | | EG | 96 | - | - | - | Insoluble |
| Coating Composition Inventive Example 13 | From water-based resin Inventive Example XI | 4 | - | | EG | 96 | - | - | - | Dissolved in 2 h |
| Coating Composition Inventive Example 14 | From solvent-based resin Inventive Example II | 32.35 | DMEA | 10.66 | NMP | 16.43 | 9.66 | 31.89 | 25 44 | Dissolved in 7 h |
| Coating Composition Inventive Example 15 | From water-based resin Inventive Example XI | 34.91 | DMEA | 9.30 | NMP | 15.80 | 9.30 | 30.69 | 27 64 | Dissolved in 2 h |
| Comparative Example 16 | AI-10 commercial PAI powder from Solvay | 32.35 | DMEA | 9.66 | NMP | 16.43 | 9.66 | 31.89 | 29 64 | Dissolved in 12 h |
| Comparative Example 17 | From solvent-based resin Inventive Example II | 4 | DMEA | 1.33 | EGNMP | 84/200 | 1.6 (furfuryl-OH) | 7.07 | - | - |

Fig. 2B

| Powder Coating Solutions to Evaluate Stability | Type of PAI powder used | Acid Value (Mg/g KOH) | pH | Days at 50C | Mn (g/mol) | Mw (g/mol) | PDI | Mw change % | DVIII (cps) | Viscosity Change % |
|---|---|---|---|---|---|---|---|---|---|---|
| Coating Composition Inventive Example 14 | From solvent-based resin Inventive Example II | 117.22 | 9.32 | 0 | 18382 | 32217 | 1.75 | - | 28890 | - |
| | | | | 7 | 17321 | 29918 | 1.73 | -7.14% | 13730 | -52.47% |
| Coating Composition Inventive Example 15 | From water-based resin as described in Example XI | 112.63 | 9.53 | 0 | 13005 | 26357 | 2.03 | - | 11116 | - |
| | | | | 7 | 13591 | 26674 | 1.96 | 1.20% | 7267 | -34.63% |
| Comparative Example 16 | AI-10 commercial PAI powder from Solvay | 143.79 | 8.87 | 0 | 15310 | 23725 | 1.55 | - | 8618 | - |
| | | | | 7 | 14707 | 22597 | 1.54 | -4.75% | 7572 | -12.14% |

*Fig. 2C*

| Powder Coating Solutions to Demonstrate Performance | Type of PAI Powder used | Sample Solvent Composition | Film Thickness (μm) | Ultimate Tensile Strength MPa | Elongation at Break % | Elastic Modulus GPa | Gardner Impact Resistance In*lbs | Pencil Hardness |
|---|---|---|---|---|---|---|---|---|
| Coating Application Performance Example 18 | Powder produced as in Example II of provisional application 62/346,440 | 100% NBP | 55-65 | 95-110 | 40-50 | 2.10-2.20 | 135-145 | 6B-7H 7H |
| Coating Application Performance Example 19 | comparative solvent based resin | 100% NPM | 55-65 | 100-115 | 45-55 | 2.15-2.25 | >160 | 7H |
| Coating Application Performance Example 20 | comparative solvent based resin | 100% NEP | 55-65 | 95-110 | 35-45 | 2.10-2.20 | 115-125 | 7H |
| Coating Application Performance Example 21 | comparative solvent based resin | NMP/Xylene | 55-65 | 135-150 | NA | NA | NA | NA |
| Coating Application Performance Example 22 | comparative solvent based resin | NAM/O-Xylene | 55-65 | 185-200 | NA | 2.35-2.45 | 35-45 | 6H |
| Coating Application Performance Example 23 | Market competitor's comparative solvent based resin | 100% NMP | 55-65 | 95-110 | NA | 1.70-1.8 | 35-45 | NA |

*Fig. 2D*

PAI-BASED COATING COMPOSITION

CROSS-REFERENCE TO RELATED APPLICATIONS

The present patent application claims priority to and incorporates by reference U.S. Provisional Patent Application No. 62/346,440, entitled "Novel Full Scale Process for Preparing Polymer Powders", filed on Jun. 6, 2016; U.S. Provisional Patent Application No. 62/346,443, entitled "Preparation Of Polyamide-Imide Resins Using N-Formyl Morpholine:3-Methoxy N,N-Dimethylpropanamide", filed on Jun. 6, 2016; and U.S. Provisional Patent Application No. 62/347,020, entitled "PAI-Based Coating Compositions", filed on Jun. 7, 2016.

TECHNICAL FIELD

Embodiments described herein generally relate to the field of chemical processing, and, more particularly, to PAI-based coating compositions.

BACKGROUND

Polyamideimide and polyamide amic acid resin polymers (hereinafter referred to as PAI) are well-known thermally stable polymers that are used for many high performance coating applications due to their excellent adhesion, temperature resistance, and high strength.

The primary route to synthesizing polyamideimide polymers in a form that is convenient for the manufacture of coatings is by reacting diisocyanate, often 4,4'-methylene diphenyldiisocyanate (MDI) with trimellitic anhydride (TMA). In this process, PAI polymers are typically manufactured in polar aprotic solvents such as N-methyl amide compounds including dimethylformamide, dimethylacetamide, N-methylpyrrolidone (NMP), N-ethylpyrrolidone.

However, with increasing regulation of certain materials and compounds, the solvents used in these polymerizations of the coating compound have recently come under scrutiny due to toxicological concerns. Thus, there is a need for generation of coating compounds that provide performance characteristics that are comparable to existing coating applications, while utilizing a safer solvent composition.

BRIEF DESCRIPTION OF THE DRAWINGS

Embodiments described here are illustrated by way of example, and not by way of limitation, in the figures of the accompanying drawings in which like reference numerals refer to similar elements.

FIG. 2A is a table to summarize a first part of the information regarding the examples according to the respective embodiments;

DETAILED DESCRIPTION

Embodiments described herein are generally directed to PAI-based coating compositions.

For the purposes of this description:

"PAI" refers to polyamideimide and polyamide amic acid resin polymers.

In some embodiments, a process is described for generation of a PAI-based CMR-free (CMR: carcinogenic, mutagenic, reprotoxic) coating composition that provides comparable performance characteristics to existing coating compositions.

A relatively clear, CMR-free (CMR: carcinogenic, mutagenic, reprotoxic) PAI coating composition solution may be derived from a PAI powder, including, but not limited to, any of processes described in Examples II and XI of U.S. provisional patent application No. 62/346,440, entitled "Novel Full Scale Process for Preparing Polymer Powders", filed on Jun. 6, 2016, and U.S. patent application Ser. No. 15/249,290, entitled "Full Scale Process for Preparing Polymer Powders", where there are effective ratios of reaction solvent, co-solvents and polymer (e.g., polyamide imide) to one another. Properties of the coating solution, such as solubility in polar aprotic solvents, may depend at least in part upon properties of the PAI powder chosen. PAI coating solutions based on powders are not limited to being composed of organic solvents, but may also be used to make water-based formulations by utilizing amines such as DMEA (dimethylethanolamine).

The rate at which the PAI powders dissolve as well as the stability of the resulting water-based coating solution are some examples of parameters to be considered for determining whether a particular combination, and particular ratios, of solvent, co-solvent and polymer are to be effective for the manufacture of a PAI-based coating composition. In some embodiments, films on aluminum substrates and novel free-standing films may be produced from CMR-free and comparative PAI coating solutions. In some embodiments, films cast from CMR-free coating solutions derived from PAI powders provide similar physical and mechanical properties to those made from NMP and NEP-based materials while utilizing a safer solvent composition.

Polyamide-imides are high performance polymers with exceptional thermal, mechanical, and chemical resistant properties. As either thermosetting or thermoplastic amorphous polymers, polyamide-imides are used in high performance coating applications. The strength, flexibility, melt processability, and adhesive properties compound polyamide-imide's coating benefits. These benefits are derived from a beneficial synergy between the polyamide and polyimide. Regulation of the solvents used in the synthesis and formulation of the polymer has driven research to reduce the use of known hazardous materials.

One advantage of the technology relates to the production of polyamide-imides without the use of carcinogenic, mutagenic, or reprotoxic (CMR) materials. The sunsetting of MDA (carcinogenic) and reclassification of NMP (a traditional solvent for PAI polymerization) as reprotoxic dictates the need for alternative means of PAI production. The technology described in U.S. provisional patent application No. 62/346,440 and U.S. patent application Ser. No. 15/249,290 uses MDI (4,4'-methylene diphenyldiisocyanate) and CMR-free solvent systems. In some embodiments, a process generates an improved CMR-free highly cross-linked PAI coating on a substrate derived from a PAI powder, thus providing a coating with desirable performance characteristics in a safer solvent composition. Herein, the term "polyamideimide" (or "PAI") also includes polyamic acid and salts of polyamic acid from which polyamideimide may be derived.

There are numerous parameters that play a role in whether or not a PAI coating solution will be effective and have the desired thermal, mechanical, and electrical properties. The first of such parameters is solvent selection. Solvents commonly used in polyamide-imide include NMP, NEP, and DMAc, though there are restrictions on the use of these solvents in Europe due to their toxicological properties. The solvent choice can affect the dissolution time of the PAI powder, the spreadability/wettability of the resulting coating, the temperature at which the coating solution cures, the cure rate, and numerous other important properties.

In addition to the selection of a solvent to obtain the desired match between the PAI coating at the surface, there are numerous substrates to which the generated coating may be applied, including glass or metal pipes, pots, pans, cans, or rubber rollers. In addition, the surface chemistry and roughness of a substrate can also be altered to affect the coating. In some embodiments, glass panels are etched with HF (hydrofluoric acid) prior to applying the PAI coating formulation to allow maximum coverage with minimal surface defects such as pin holes or fish eyes. In some embodiments, after curing, the coated glass panels are placed in a humidity chamber for various amounts of time to aid in the release of the coatings from the substrate. These surface altering techniques aid in the production of defect-free films suitable for dog bone fabrication and tensile testing.

The solvent selection, along with the concentration, also affects the viscosity of the generated coating solution. An appropriate boiling point is one consideration. Solvents with boiling points in the range of 150-240° C. have proven to be most suitable for coating applications. The desired viscosity of the coating solution can be dependent upon the application and whether the coating solution is brushed, rolled, dipped, misted, sprayed, or applied using any other known application by those who are skilled in the art. Various viscosity modifiers and thinning solvents can be added to the coating solution to reduce the viscosity without adversely affecting the performance which include but are not limited to methyl ethyl ketone, 1-butanol, 2-propanol, acetone, triethylene glycol, propyl propionate, propylene glycol methyl ether, propylene glycol propyl ether, methyl acetate, ethyl acetate, and mixtures thereof.

In some embodiments, PAI powder is isolated from a NFM:MEK solution by precipitation into excess MEK, wherein NFM refers to N-formyl morpholine and MEK refers to methyl ethyl ketone. The powder is then subsequently used to make a CMR-free coating formulation by re-dissolution into solvents such as NBP and other co-solvents (as illustrated in Examples I-XI below), wherein the viscosity of the resulting solution may then be measured. In some embodiments, PAI coatings ranging from 5-100 µm in thickness are created using CMR free solvent systems, with the percentage of solids ranging from 4-40% solids.

In some embodiments, high acid number (high polyamic acid content) PAI powder as described in U.S. provisional patent application 62/346,440 is utilized to make a CMR-free ethylene glycol solvent-based coating solution, as demonstrated in Example XIII of this embodiment. In some embodiments, both types of powders are re-dissolved in and reacted with water and amine to give aqueous coating formulations (Examples XIV and XV, respectively). Aqueous-based coating compositions comprised of this polyamic acid salt form of the polymer have been used in a variety of applications ranging from cookware to coating and sizing fibers, metal surfaces, glass substrates, and other materials. Parameters such as the dissolution time of the powders and stability of the coating solutions were explored. Free-standing films of CMR-free and NMP/NEP-based PAI coating solutions were made along with films on Al substrates. The mechanical properties of the films were measured and found to be comparable.

Figure 1:
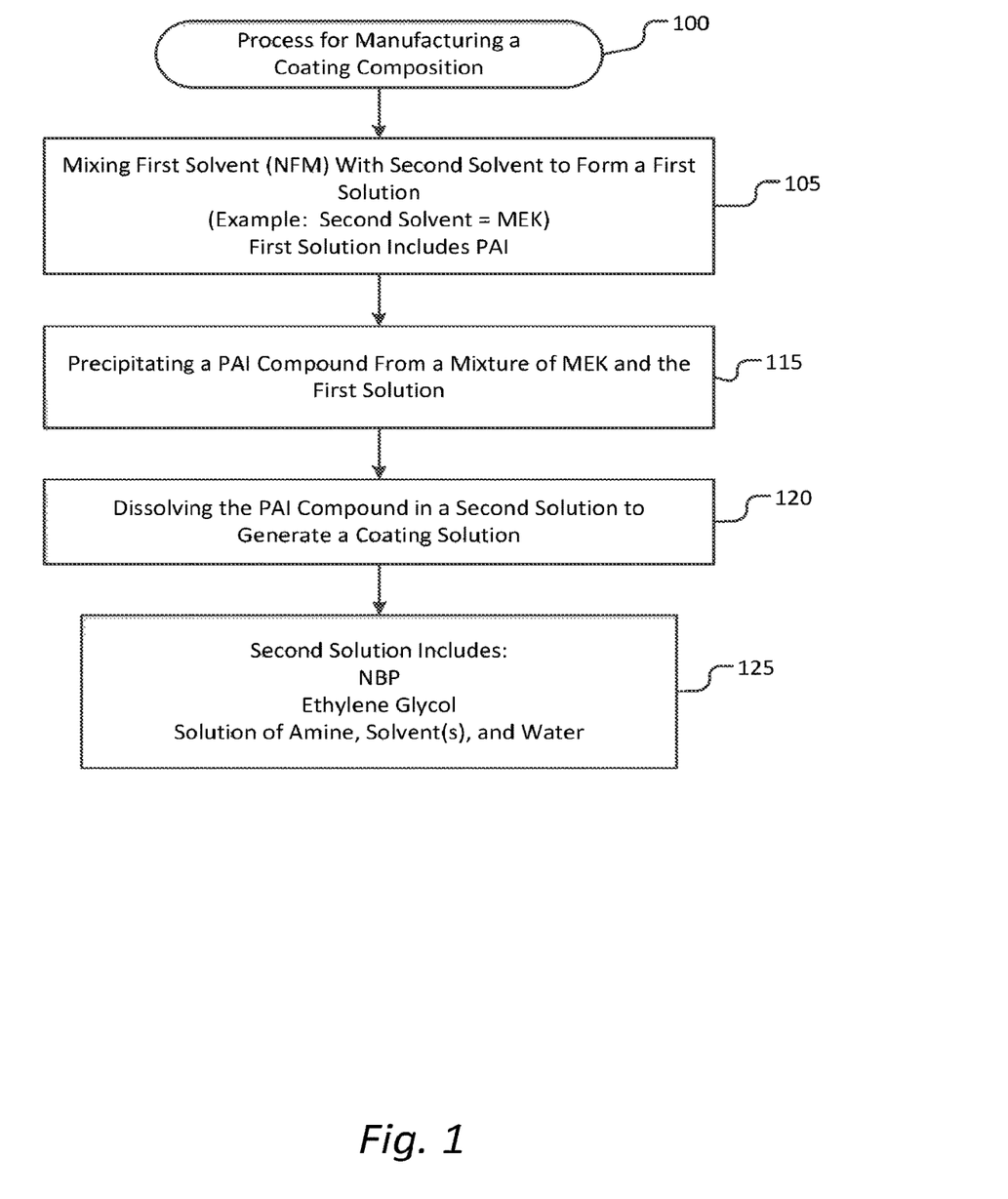
FIG. 1 is a flow chart to illustrate generation of a coating composition according to an embodiment.

FIG. 1 is a flow chart to illustrate generation of a coating composition according to an embodiment. In some embodiments, a method includes manufacturing a coating composition 100, the manufacturing of the coating composition including:

Mixing a first solvent, the first solvent being N-formyl morpholine (NFM), with a second solvent to form a first solution 105, wherein the first solution includes polyamideimide or polyamide amic acid resin polymer (PAI). In some embodiments, the second solvent is methyl ethyl ketone (MEK), as illustrated in FIG. 1.

Precipitating a PAI compound from a mixture of MEK and the first solution 115.

Dissolving the PAI compound in a second solution to generate a coating solution 120, where the second solution is formed of N-butyl pyrrolidone (NBP), ethylene glycol, or a solution of an a) amine, b) one or more solvents, and c) water 125.

In some embodiments, the second solvent is a precipitation solvent selected from, but not limited to, alcohols, amides, acetates, aldehydes, ethers, ketones, lactams, pyrrolidones, morpholines, morpholine derivatives, sulfoxides and mixtures thereof.

In some embodiments, the second solution is formed with NBP. In some embodiments, the second solution is further formed with one or more organic co-solvents. In some embodiments, the one or more co-solvents include n-butyl acetate. In some embodiments, the one or more co-solvents include cyclohexanone. In some embodiments, the one or more co-solvents include 3-methoxy N,N dimethylpropanamide (MDP). In some embodiments, the one or more co-solvents include 2-octanone.

In some embodiments, the second solution is 100% ethylene glycol. In some embodiments, the first solution for dissolving of the PAI further includes Triethyl amine (TEA) and water to generate the tertiary amine salt of the polyamide-amic acid prior to precipitation.

In some embodiments, the second solution comprises a) an amine, b) one or more solvents, and c) water. In some embodiments, the amine is a tertiary aliphatic amine, the amine being dimethylethanolamine (DMEA), and the one or more co-solvents are N-methylpyrrolidone (NMP) and 1-methoxy-2-propanol (propylene glycol methyl ether, or PGME).

In some embodiments, the method further includes applying the resulting coating solution to a surface in a process, wherein the process is one of a spinning, laminating, molding, or extruding process.

In some embodiments, a coating compound is manufactured by a process including mixing a first solvent NFM with a second solvent to form a first solution, wherein in certain embodiments the second solvent is MEK; dissolving PAI in the first solution; precipitating a PAI compound from a mixture of MEK and the first solution; and dissolving the PAI compound in a second solution to generate a coating solution, where the second solution is formed with one or more of: NBP, ethylene glycol, or a solution of an a) amine, b) one or more solvents, and c) water.

In some embodiments, a film is generated from the coating composition. In some embodiments, the second solution is formed with NBP. In some embodiments, the second solution is further formed with one or more organic co-solvents.

In some embodiments, the coating composition is used in flexible electronic applications, in which electronic circuit devices are mounted on a flexible substrate, more specifically to enhance the physical and mechanical properties including but not limited to adhesion, smoothness, cracking, breaking, and flexibility of a single or multilayer film comprised of a conductive ink including but not limited to ITO and AG cast on a substrate including but not limited to Kapton polyimide for use in consumer electronic applications.

In some embodiments, the coating composition is used as an additive for automotive coating applications.

In some embodiments, the coating composition is sprayed, brushed, dipped, rolled, misted or applied via any other known method to those who are skilled in the art for use as a binder as in applications including but not limited to pipes, pots, pans, rubber rollers and non-stick cookware applications alone or in combination with polyethersulfones, polyetherimides, polyimides, or combinations thereof.

In some embodiments, the coating composition is used for corrosion-resistance for metal or other substrates.

In some embodiments, the coating composition is used in the pre-treatment of another polymer film, such as a polyester film, a polyamide film, a polyimide film, a polyetherimide, or a polyether sulfone film, or combinations thereof.

In some embodiments, the coating composition is used as an adhesive to plastic or metallic film materials. In some embodiments, the coating composition is adhered to at least one surface of a metal article or substrate. In some embodiments, the coating composition is used as an additive to improve the performance of inks. In some embodiments, the coating composition is used in an industrial spray coating such as metallic or plastic thermal spray coating systems. In some embodiments, the coating composition is used in wire enamels and enamels in container coating applications. In some embodiments, non-treated or heat treated fibers coated from a film comprised of a coating composition.

Figure 2B:
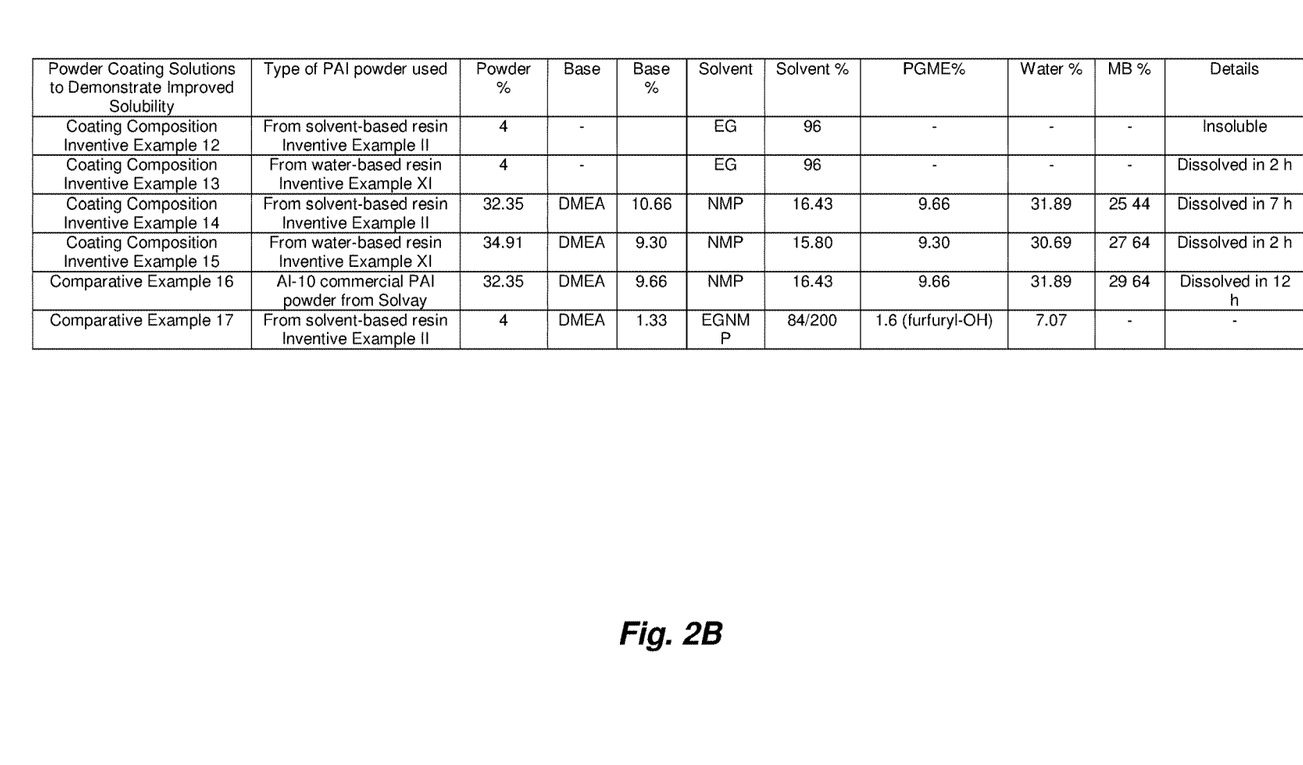
FIG. 2B is a table to summarize a second part of the information regarding the examples according to the respective embodiments.
Figure 2C:
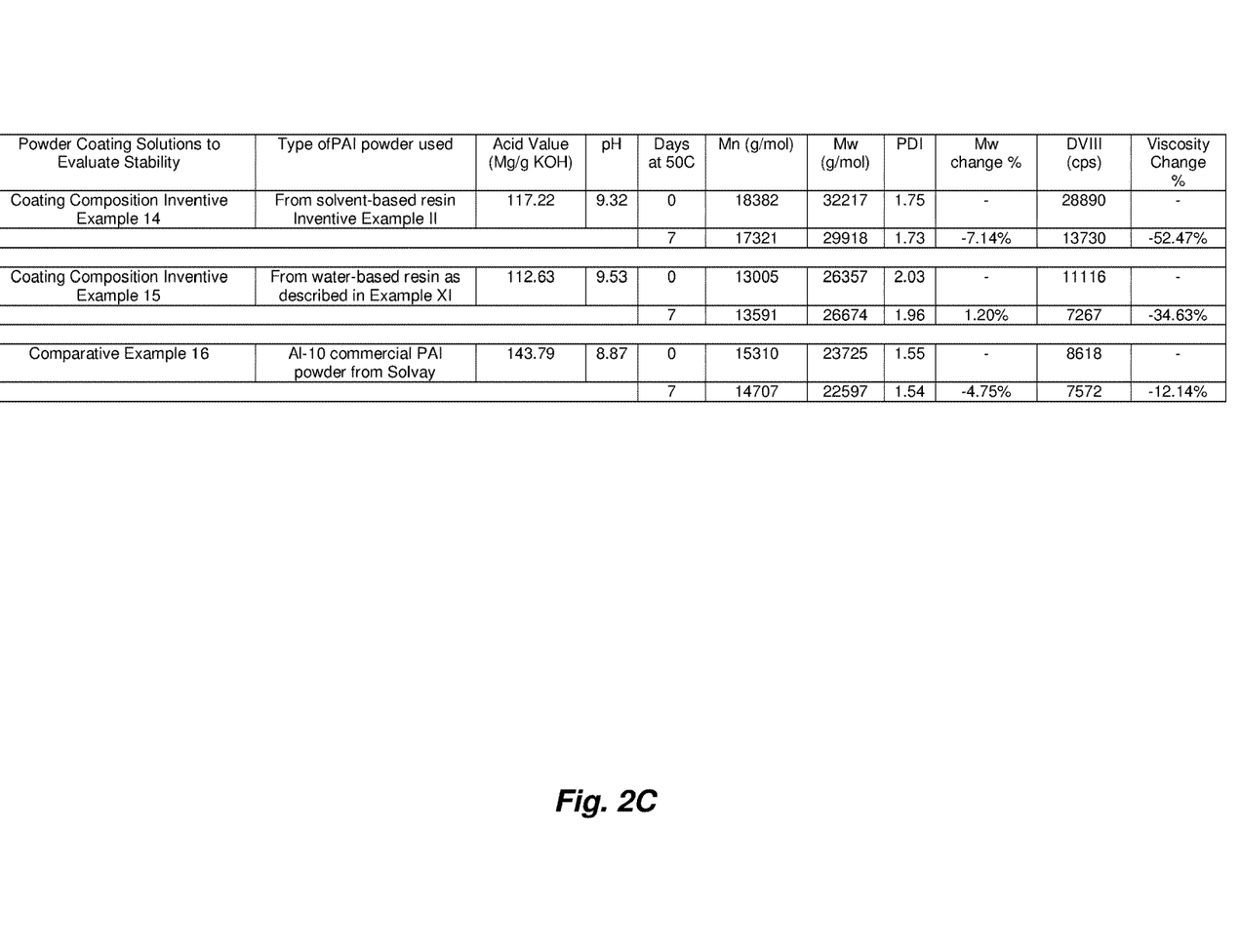
FIG. 2C is a table to summarize a third part of the information regarding the examples according to the respective embodiments.
Figure 2D:
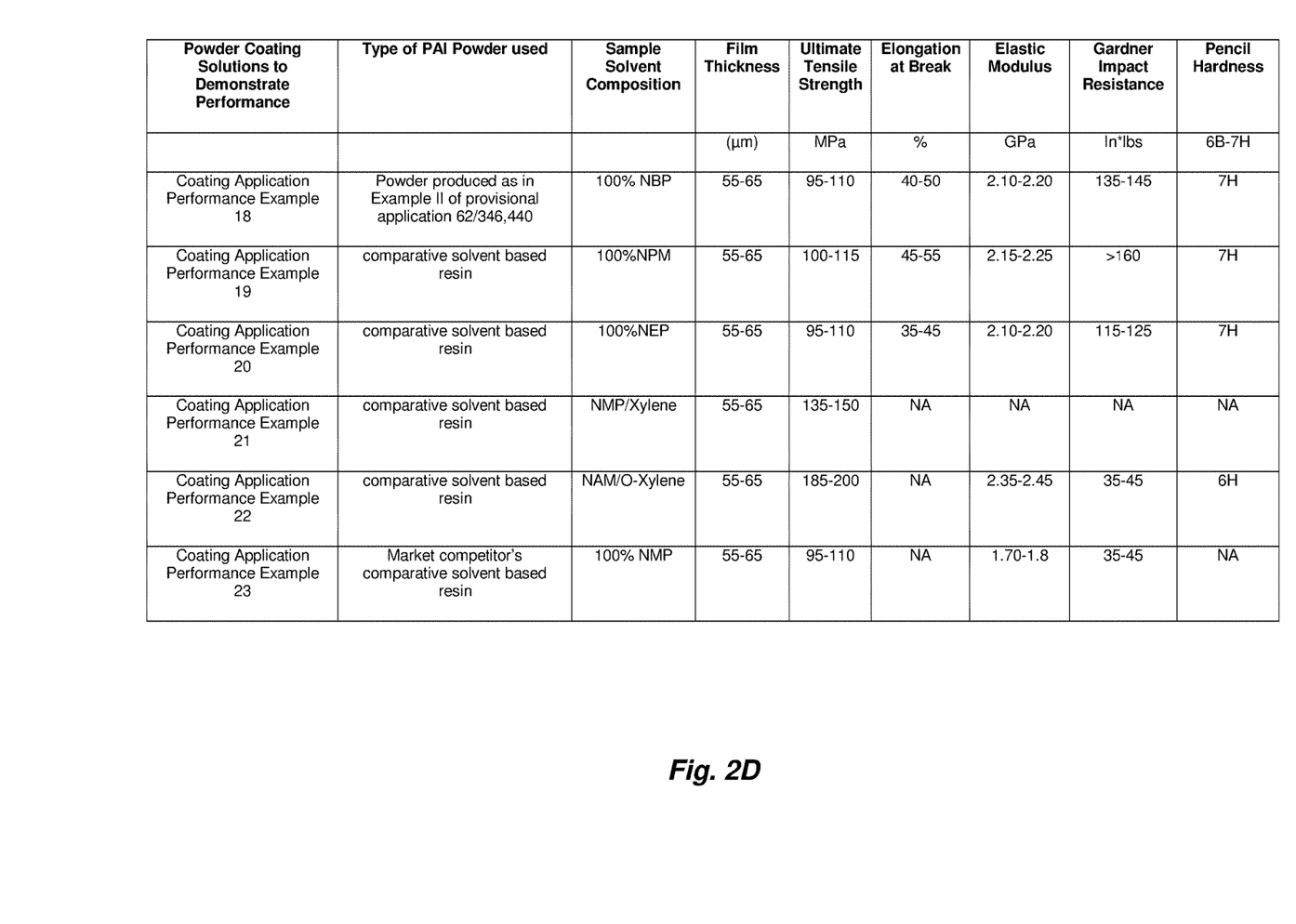
FIG. 2D is a table to summarize a fourth part of the information regarding the examples according to the respective embodiments.

FIGS. 2A-2D illustrates features of examples of implementations according to a corresponding embodiment. More specifically, FIG. 2A is a table to summarize a first part of the information regarding the examples according to the respective embodiments; FIG. 2B is a table to summarize a second part of the information regarding the examples according to the respective embodiments; FIG. 2C is a table to summarize a third part of the information regarding the examples according to the respective embodiments; and FIG. 2D is a table to summarize a third part of the information regarding the examples according to the respective embodiments.

In some embodiments, a process or apparatus may include one or more of the following examples. However, embodiments are not limited to these examples or the specific manner in which the examples are implemented.

Coating Composition Example I

PAI powder obtained from an NFM:MEK solution via precipitation into MEK followed by drying as described in Example II of U.S. provisional patent application 62/346, 440 was taken and dissolved in a 100% N-butyl pyrrolidone (also referred to as TamisolvNXG commercially available from Eastman/Taminco; also known as 1-Butyl-2-pyrrolidinone; herein referred to as "NBP") solution to a concentration of 21% solids. The viscosity (DVIII, 23° C.) was measured and found to be 950 cP.

Coating Composition Example II

The procedure of Example I was followed except the powder was dissolved in a 90:10 NBP:BA (BA=n-butyl acetate) solution by mass to a concentration of 21% theoretical solids. The viscosity (DVIII, 23° C.) was measured and found to be 770 cP.

Coating Composition Example III

The procedure of Example I was followed except the powder was dissolved in an 80:20 NBP:BA solution by mass to a concentration of 21% theoretical solids. The viscosity (DVIII, 23° C.) was measured and found to be 645 cP.

Coating Composition Example IV

The procedure of Example I was followed except the powder was dissolved in a 70:30 NBP:BA solution by mass to a concentration of 21% theoretical solids. The viscosity (DVIII, 23° C.) was measured and found to be 577 cP.

Coating Composition Example V

The procedure of Example I was followed except the powder was dissolved in a 90:10 NBP:CHN (CHN=cyclohexanone) solution by mass to a concentration of 21% theoretical solids. The viscosity (DVIII, 23° C.) was measured and found to be 900 cP.

Coating Composition Example VI

The procedure of Example I was followed except the powder was dissolved in an 80:20 NBP:CHN solution by mass to a concentration of 21% theoretical solids. The viscosity (DVIII, 23° C.) was measured and found to be 832 cP.

Coating Composition Example VII

The procedure of Example I was followed except the powder was dissolved in a 70:30 NBP:CHN solution by mass to a concentration of 21% theoretical solids. The viscosity (DVIII, 23° C.) was measured and found to be 788 cP.

Coating Composition Example VIII

The procedure of Example I was followed except the powder was dissolved in a 90:10 NBP:MDP (MDP=3-methoxy N,N-dimethylpropanamide; also known as "Equamide" or "Equamide M100" commercially available from Idemitsu or "KJCMPA-100" commercially available from KJ Chemicals or "3-methoxy-N,N-dimethylpropionamide" herein referred to as "MDP") solution by mass to a concentration of 21% theoretical solids. The viscosity (DVIII, 23° C.) was measured and found to be 893 cP.

Coating Composition Example IX

The procedure of Example I was followed except the powder was dissolved in an 80:20 NBP:MDP solution by mass to a concentration of 21% theoretical solids. The viscosity (DVIII, 23° C.) was measured and found to be 788 cP.

Coating Composition Example X

The procedure of Example I was followed except the powder was dissolved in an 85:15 NBP:Oct (Oct=2-octanone) solution by mass to a concentration of 21% theoretical solids. The viscosity (DVIII, 23° C.) was measured and found to be 742 cP.

Coating Composition Example XI

The procedure of Example I was followed except the powder was dissolved in a 70:30 NBP:Oct (Oct=2-octanone) solution by mass to a concentration of 21% theoretical solids. The viscosity (DVIII, 23° C.) was measured and found to be 606 cP.

For Coating Composition Examples I through XI the powder used was PAI powder obtained from an NFM:MEK solution via precipitation into MEK followed by drying as described in Example II of U.S. provisional patent application 62/346,440. It should be noted that other PAI powders prepared in the same fashion as described in the cited embodiment may be used to make CMR-free PAI coating solutions. As will be demonstrated, Example XI of U.S. provisional patent application 62/346,440, which is a higher acid number PAI powder, may also be used.

Coating Composition Examples I through XI used combinations of NBP and other co-solvents such as BA, CHN, MDP, and Oct to dissolve the powder and reduce the viscosity of the resulting formulation. Various solvent combinations may be used to make coatings of the previously described PAI powders including but not limited to N-acetyl morpholine, diethyl acetamide, di-N-propyl acetamide, N-formyl morpholine, diacetylpiperazine, N,N-diisopropylacetamide, di-N-butylacetamide, di-N-propylacetamide and N-propionyl morpholine methyl actetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, ε-caprolactone, methylcyclohexane, N-n-butylpyrrolidone, N-isobutylpyrrolidone, N-t-butylpyrrolidone, N-n-pentylpyrrolidone, N-(methyl-substituted butyl) pyrrolidone, ring-methyl-substituted N-propyl pyrrolidone, ring-methyl-substituted N-butyl pyrrolidone, N-(methoxypropyl) pyrrolidone, N-(methoxypropyl) pyrrolidone, 1,5-dimethylpyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, TamiSolve® NxG, propylene glycol methyl ether acetate, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, Rhodiasolv® RPDE-K, Rhodiasolv® PolarClean, Rhodiasolv® Infinity, Rhodiasolv® IRIS, diethylethanolamine and, N-ethylmorpholine, γ-hexalactone, tetrahydrofuran, furfuryl alcohol, acetophenone, cumene, cyclopentylmethyl ether, methyl-tetrahydrofuran, N-octyl pyrrolidone, dioxalane, methylethylketone, dimethylsuccinate, and N-cyclohexylpyrrolidone, or mixtures thereof the aforementioned solvents. When using only two solvents, one example ratio of primary solvent to co-solvent may be in a range of 99:1 to 1:99 (e.g., in a range of 90:10 to 10:90) by mass. However formulations containing 3 to 7 (or more) solvents are also possible.

The viscosity is one example parameter that may be significant in coating solutions as it is directly related to the application. For example, the ability to effectively spray coat a PAI resin solution is directly related to the viscosity of the PAI coating solution. The viscosity is a function of both the concentration of the powder as well as the solvent mixture. For Coating Composition Examples I through XI the concentration was kept at a 21% theoretical solids. One example concentration of PAI powder coatings may be in a range of 10 to 60% solids (e.g., in a range of 20 to 50% solids). For Coating Composition Examples I through XI the BA, CHN, MDP, and Oct co-solvent amounts were varied to capture the effect of the co-solvents on the viscosity of the coating solutions. The final viscosities (DVIII, 23° C.) was measured and the relative percentage of viscosity reduction compared to a 100% NBP control was calculated. Notable NBP:co-solvent solutions used to reduce the viscosity of PAI coating solutions were the 70:30 NBP:BA, which showed a 39% relative reduction in viscosity, and the 70:30 NBP:Oct which showed a 36% relative reduction in viscosity.

Coating Composition Example XII

PAI powder obtained from an NFM:MEK solution via precipitation into MEK followed by drying as described in Example II of U.S. provisional patent application 62/346,440 was taken and added to a solution of ethylene glycol (EG) at a concentration of 4%. Even after 12 hours of agitation and the addition of heat (50° C.) the powder did not completely dissolve.

Coating Composition Example XIII

PAI powder as described in Example XI of U.S. provisional patent application 62/346,440 was taken and added to a solution of ethylene glycol (EG) at a concentration of 4%. The powder easily dissolved in 2 hours.

The Coating Composition Examples XII and XIII demonstrate how utilizing a PAI powder with a different polymer structure (higher Acid Number/amic acid content) may be used to enhance solubility. The PAI powder from Example 1 of U.S. provisional patent application 62/346,440 had a mostly imidized structure which was reflected in the low Acid Number measured (<10 mg KOH/g polymer). As can be seen in Coating Composition Example XII of this embodiment, the powder was only slightly (~1%) soluble in a solution of ethylene glycol. However the PAI powder from Example XI of U.S. provisional patent application 62/346,440 had a different structure that had mostly been converted to the polyamide amic acid as was reflected in the high Acid Number (>50 mg KOH/g polymer). Coating Composition Example XII of this embodiment shows that the high amic acid content powder was much more soluble in the ethylene glycol solution as a 4% solids solution and was able to be dissolved in only 2 hours. This solution also represents a CMR-free water-based PAI coating solution. The solution was coated on a Kapton™ polyimide substrate and cured at 250° C. to give a 10 μm film with excellent flexibility with no cracking when subjected to a T-bend test.

Coating Composition Example XIV

PAI powder obtained from an NFM:MEK solution via precipitation into MEK followed by drying as described in Example II of U.S. provisional patent application 62/346,440 was taken and slowly added to a solution containing the appropriate amounts of NMP, PGME (1-methoxy-2-propanol, or propylene glycol methyl ether), DMEA and water heated at 80° C. with agitation until dissolved (7 hours).

Coating Composition Example XV

PAI powder as described in Example XI of U.S. provisional patent application 62/346,440 was taken and slowly added to a solution containing the appropriate amounts of NMP, PGME, DMEA and water heated at 80° C. with agitation until dissolved (2 hours).

Comparative Example XVI

The procedure of Example XV was followed except a commercial PAI powder was used (AI-10 commercially available through Solvay) with slightly different amounts of NMP, PGME, DMEA and water heated at 80° C. with agitation until dissolved (12 hours).

The purpose of Coating Composition Example XIV and XV and Comparative Example XVI is to compare powder dissolution when using different types of PAI powder to make a water-based coating formulation. Many applications as previously discussed require the PAI to be solubilized in a water-miscible formulation. These particular water-based coatings were prepared from PAI powders to concentrations of 32 to 35%. The PAI powder concentration may be in a range of 10% to 60% solids (e.g., in a range of 20% to 50% solids). In these coating compositions, amine and water are used to convert the polyamideimide to the polyamide amic acid. Though DMEA is used in this example due to its toxicological profile, numerous other bases or amines are possible including but not limited to Triethyl amine (TEA), Dimethylethanolamine (DMEA), trimethyl amine, diethyl 2-hydroxyethyl amine, tripropyl amine, dimethylethylamine, tributyl amine, tris(2-hydroxyethyl) amine, N,N-.dimethylaniline, .morpholine, pyridine, N-methyl-pyrrole, ethyl bis(2-hydroxyethyl) amine, and mixtures thereof. The percentage of amine in the final PAI water-based coating may be in a range of 2% to 50% (e.g., in a range of 5% to 30%) amine. Additionally the % water in the PAI water-based formulation by mass may be in a range of 5% to 50% (e.g., in a range of 5% to 35%). Though these two examples are not CMR-free due to the presence of NMP, other CMR-free and non CMR-free coating solutions from PAI powders are possible—e.g., by using one or more solvents such as N-acetyl morpholine, diethyl acetamide, di-N-propyl acetamide, N-formyl morpholine, diacetylpiperazine, N,N-diisopropylacetamide, di-N-butylacetamide, di-N-propylacetamide and N-propionyl morpholine methyl actetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, n-acetyl morpholine, ε-caprolactone, methylcyclohexane, N-n-butylpyrrolidone, N-isobutylpyrrolidone, N-t-butylpyrrolidone, N-n-pentylpyrrolidone, N-(methyl-substituted butyl) pyrrolidone, ring-methyl-substituted N-propyl pyrrolidone, ring-methyl-substituted N-butyl pyrrolidone, N-(methoxypropyl) pyrrolidone, N-(methoxypropyl) pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, Tami Solve® NxG, propylene glycol methyl ether acetate, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, Rhodiasolv® RPDE-K, Rhodiasolv® PolarClean, Rhodiasolv® Infinity, Rhodiasolv® IRIS, γ-hexalactone, tetrahydrofuran, furfuryl alcohol, acetophenone, cumene, cyclopentylmethyl ether, methyl-tetrahydrofuran, N-octyl pyrrolidone, dioxalane, methylethylketone, dimethylsuccinate, N-methylcaprolactame and N-cyclohexylpyrrolidone, or mixtures thereof containing the aforementioned solvents.

Dissolution time of the powder as the polyamide imide is converted to the more hydrophilic polyamide amic acid is a key parameter when evaluating powders. As can be seen from Coating Composition Example XIV, the PAI powder used in this example took 7 hours to dissolve whereas the more hydrophilic, higher acid number powder (more amic/carboxylic acid groups) used in Coating Composition Example XV took only 2 hours. Comparative Example XVI took 12 hours for comparison, demonstrating that the two example powders of this embodiment show a large improvement in dissolution time relative to the commercial example. However, numerous other parameters may affect dissolution time such as the molecular weight, the particle size, presence of residual solvent or impurities and aspects of the primary polyamide imide structure.

The stability of PAI powder coating solutions is one example of a characteristic that may be important in the industry as formulations need to be made and be able to be stable within the demands of the application before being converted to a coating. The stability of Coating Composition Example XIV and XV and Comparative Example XVI was compared by taking the solutions and comparing the initial and final viscosity (DVIII, 23° C.) and GPC information after 7 d at 50° C. to emulate accelerated aging. The change in viscosity relative to the initial of the coating solutions ranged from 12-52% and did not mirror the decrease in molecular weight. Though the viscosity may also be important for reasons previously described, molecular weight (Mw) may be closely tied to performance properties of a material, and the percentage of molecular weight (Mw) changes of the samples were much less dramatic. The powder used to make Coating Composition Example XV showed an even smaller percentage Mw loss (+1.2% within the error of the measurement; essentially no change) than the AI-10 Comparative Example XVI, demonstrating that the powder used in the formulation may be used to make PAI coating solutions with improved Mw stability.

Coating Composition Example XVII

PAI powder obtained from an NFM:MEK solution via precipitation into MEK followed by drying as described in Example II of U.S. provisional patent application 62/346,440 was taken and slowly added to a solution containing the appropriate amounts of NMP, furfuryl alcohol, DMEA and water heated at 80° C. with agitation until dissolved (7 hours). The solution was then diluted to 4% solids using ethylene glycol.

Both the solution from Coating Composition Example 13 and Coating Composition Example 17 described above were cast onto Kapton™ polyimide substrates using a 20 mil birdbar at a rate of 0.3 m/s to give films with a thickness of 10 μm. The films were cured in an oven using separate cure profiles, and displayed excellent adhesion and flexibility as determined by bending the films 180° over a 1 mm rod. No cracking or adhesion loss was observed.

In this embodiment, the PAI powders can be used as described in the coating solution examples above as a smoothing layer and adhesion tie layers for applications in the consumer electronics industry, such as ink additives. Utilizing these PAI coating formulations alone or in conjunction with ITO (Indium tin oxide) or Ag inks could result in single or multilayer materials with enhanced adhesion to and water resistance on Kapton™ as well as additional substrates and other improved mechanical properties.

Coating Application Example XVIII-XXIII

PAI coating composition as described in Example II of U.S. provisional patent application 62/346,440 was drawn down on various substrates (glass, aluminum, steel, and Kapton™) using bird bars of differing thickness (2 mil-50 mil). The substrate was prepared by cleaning with organic solvents, followed by drying for >20 minutes at 130° C. PAI powder redissolved in solvent formulations was displaced in front of the leading edge of the bird bar, which was then drawn down to create a film of the desired wet thickness. The preferred concentration range is 18 to 40% solids. It has already been noted that the concentration will affect the thickness of the resulting coating. When using a doctor blade, the percentage of solids value of the resin will indicate the dried coating thickness; the wet vs dry thickness of the film is relative to the percentage of solids. The preferred viscosity for drawdown applications is 500-5000 cP. Drawdowns were performed at a rate of 0.3 m/s. It is noted that the viscosity range may change based on the preferred application method (for example, using a spray nozzle). The coated substrates were placed in an oven and subjected to an appropriate cure profile.

Cure profiles for coatings described in Example XVIII-XXIII are dictated by the solvent formulation in which the PAI powder is dissolved. Isothermal steps in the cure profile are determined by solvent formulation boiling points. The initial dry off period of cure profiles occurs between 50 and 130° C. The cure temperature then ramps to a point 30 to 70° C. below the lowest boiling point of those in the solvent formulation. This step is repeated for each solvent boiling point. After these ramping and isothermal steps, the coating is exposed to curing temperature ranging from 230 to 260° C. This final step fully evaporates remaining solvent, as well as cures the PAI coating. The isothermal steps range from 5 to 30 minutes, with ramp rates ranging from 3 to 8° C. per minute.

Film quality is initially evaluated via visual inspection and mechanical testing, with chemical and electrical resistance following. Cure profiles are refined to minimize time while maximizing performance. Comparison of properties with previously commercially successful samples was used to evaluate formulation and curing efficacy.

The invention claimed is:

1. A method for manufacturing a coating composition, the method comprising:
    mixing a first solvent, the first solvent being N-formyl morpholine, with a second solvent to form a first solution, the first solution comprising polyamideimide or polyamide amic acid resin polymer (PAI);
    precipitating a PAI compound from a mixture comprising methyl ethyl ketone and the first solution; and
    dissolving the PAI compound in a second solution to generate a coating solution, wherein the second solution comprises one or more of:
        N-butyl pyrrolidone, ethylene glycol, or a solution of an a) amine, b) one or more solvents, and c) water.

2. The method of claim 1, wherein the second solvent is methyl ethyl ketone.

3. The method of claim 1, wherein the second solution comprises N-butyl pyrrolidone.

4. The method of claim 3, wherein the second solution further comprises one or more organic co-solvents.

5. The method of claim 4, wherein the one or more co-solvents comprises n-butyl acetate.

6. The method of claim 4, wherein the one or more co-solvents comprises cyclohexanone.

7. The method of claim 4, wherein the one or more co-solvents comprises 3-methoxy N,N dimethylpropanamide.

8. The method of claim 4, wherein the one or more co-solvents comprises 2-octanone.

9. The method of claim 1, wherein the second solution is 100% ethylene glycol.

10. The method of claim 9, wherein the first solution for dissolving of the PAI further comprises triethyl amine and water to generate a tertiary amine salt of the polyamide-amic acid prior to precipitation.

11. The method of claim 1, wherein the second solution comprises a) an amine, b) one or more solvents, and c) water.

12. The method of claim 11, wherein the amine is a tertiary aliphatic amine, and wherein the one or more co-solvents comprise N-methylpyrrolidone or 1-methoxy-2-propanol.

13. The method according to claim 1, further comprising applying the resulting coating solution to a surface for a process, the process being one of a spinning, laminating, molding, or extruding process.

14. The method according to claim 12, wherein the tertiary aliphatic amine comprises dimethylethanolamine.

15. The method according to claim 1, wherein the precipitated PAI compound is washed with methyl ethyl ketone before the PAI compound is dissolved in the second solution.

16. The method of claim 15, wherein the PAI compound is dried in an oven before the PAI compound is dissolved in the second solution.

17. The method of claim 1, wherein a high shear mixer is used to mix the first solution.

18. The method of claim 1, wherein the ratio of the first solvent to the second solvent in the first solution is about 70:30.

19. The method of claim 1, wherein the first solution contains about 26% by weight of PAI.

20. The method of claim 1, wherein the first solution is prepared in a horizontal reactor.

* * * * *